US009783095B2

(12) United States Patent
Hale

(10) Patent No.: US 9,783,095 B2
(45) Date of Patent: Oct. 10, 2017

(54) METHOD AND APPARATUS FOR A TIE-DOWN STRAP RETENTION DEVICE

(71) Applicant: Marc Hale, Henderson, NV (US)

(72) Inventor: Marc Hale, Henderson, NV (US)

( * ) Notice: Subject to any disclaimer, the term of this patent is extended or adjusted under 35 U.S.C. 154(b) by 189 days.

(21) Appl. No.: 14/719,732

(22) Filed: May 22, 2015

(65) Prior Publication Data

US 2015/0336498 A1 Nov. 26, 2015

Related U.S. Application Data

(60) Provisional application No. 62/001,822, filed on May 22, 2014.

(51) Int. Cl.
*B60P 7/08* (2006.01)

(52) U.S. Cl.
CPC ......... *B60P 7/0846* (2013.01); *Y10T 24/3924* (2015.01)

(58) Field of Classification Search
CPC ........................... B60P 7/0846; Y10T 24/3924
See application file for complete search history.

(56) References Cited

U.S. PATENT DOCUMENTS 673,658 A * 5/1901 Lawler .................... F16G 11/14 24/129 B
1,008,810 A * 11/1911 Freese ..................... B42F 13/02 24/129 B
1,070,389 A * 8/1913 Beck ....................... F16G 11/14 24/129 B
1,784,679 A * 12/1930 Paterson ................ B65D 63/14 24/129 B
1,929,843 A * 10/1933 Gaus ...................... B65D 63/14 24/129 B
2,181,353 A * 11/1939 Wenk, Jr. ............. B65D 77/185 24/129 B
2,809,409 A * 10/1957 Rosenbaum ............ E06B 9/326 24/129 B
2006/0130290 A1* 6/2006 Yi ............................. F16L 3/12 24/129 B
2013/0291353 A1* 11/2013 Lu ......................... B60P 7/0846 24/68 E
2015/0136626 A1* 5/2015 Hagan ................... B60P 7/0846 206/389

* cited by examiner

*Primary Examiner* — Robert J Sandy
*Assistant Examiner* — Louis Mercado
(74) *Attorney, Agent, or Firm* — The Noblitt Group, PLLC

(57) ABSTRACT

A tie-down strap retention device may have a strap board and a plurality of retention flaps. The retention flaps may form a self-locking structure to retain extra portions of the tie-down strap. A first edge portion may project upwardly from the upper surface of the strap board. A first strap retention section may extend inwardly from the first edge portion toward a center portion of the strap board to form a first space between the strap board and the first flap retention section. A second edge portion may project upwardly from the upper surface of the strap board. A second strap retention section may extend inwardly from the second edge portion toward a center portion of the strap board to form a second space between the strap board and the second flap retention section.

13 Claims, 5 Drawing Sheets

METHOD AND APPARATUS FOR A TIE-DOWN STRAP RETENTION DEVICE

CROSS-REFERENCES TO RELATED APPLICATIONS

This application claims the benefit of U.S. Provisional Patent Application No. 62/001,822, filed May 22, 2014, and incorporates the disclosure of the application by reference.

BACKGROUND OF INVENTION

Currently available methods and products for securing tie-down straps do not provide sufficient capabilities to secure extra unused lengths of tie-down material. As a result, extra tie-down material is often left hanging free from the item secured by the tie-down strap. The extra tie-down strap material may lead to unsafe conditions, such as when the item is moved by a vehicle.

SUMMARY OF THE INVENTION

Methods and apparatus for a tie-down strap retention device may comprise a strap board and a plurality of retention flaps coupled to the strap board. The retention flaps may be configured to form a self-locking structure to retain any extra portions of the tie-down strap not able to fit between a first end and a second end of the strap board.

The strap board may comprise a first edge portion that projects upwardly from an upper surface of the strap board between a first and second end. A first strap retention section may extend inwardly from the first edge portion towards a center portion of the upper surface of the strap board to form a first space between the upper surface of the strap board and the first flap retention section. The strap board may further comprise a second edge portion that projects upwardly from the upper surface of the strap board between the first end and the second end. A second strap retention section may extend inwardly from the second edge portion towards a center portion of the upper surface of the strap board to form a second space between the upper surface of the strap board and the second flap retention section.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps.

Such functional blocks may be realized by any number of components configured to perform the specified functions and achieve the various results. For example, the present technology may employ various types of materials, connectors, adjusters, and the like, which may carry out a variety of functions. In addition, the present technology may be practiced in conjunction with any number of processes for securing devices, increasing safety, and reducing hazards associated with excess strappings, and the system described is merely one exemplary application for the technology. Methods and apparatus for a tie-down strap retention device according to various aspects of the present invention may operate in conjunction with any suitable tie-down material. Various representative implementations of the present invention may be applied to any type of tie-down strap.

Figure 1:
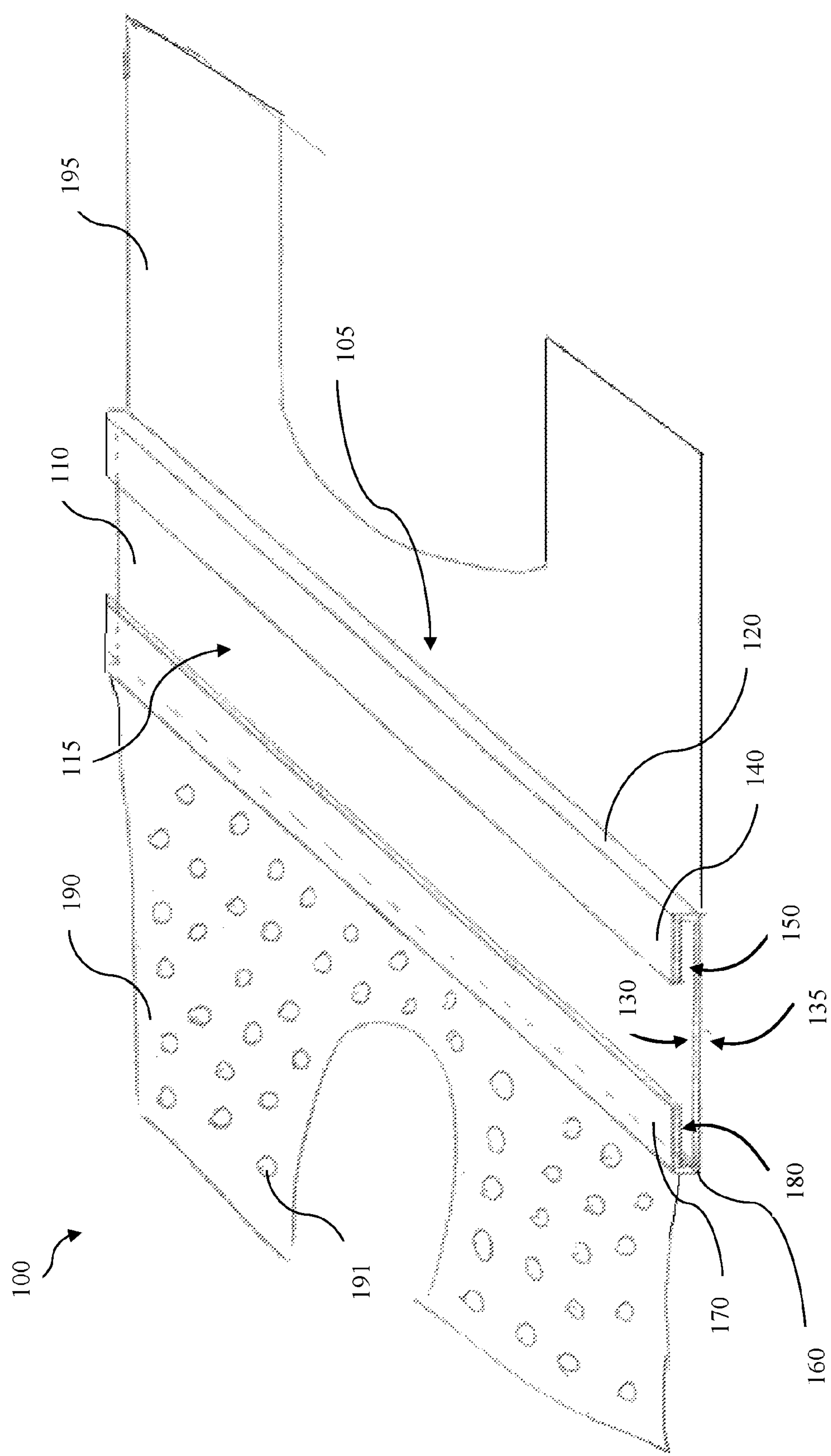
FIG. 1 representatively illustrates a tie-down strap retention device in accordance with an exemplary embodiment of the present technology.
Figure 2:
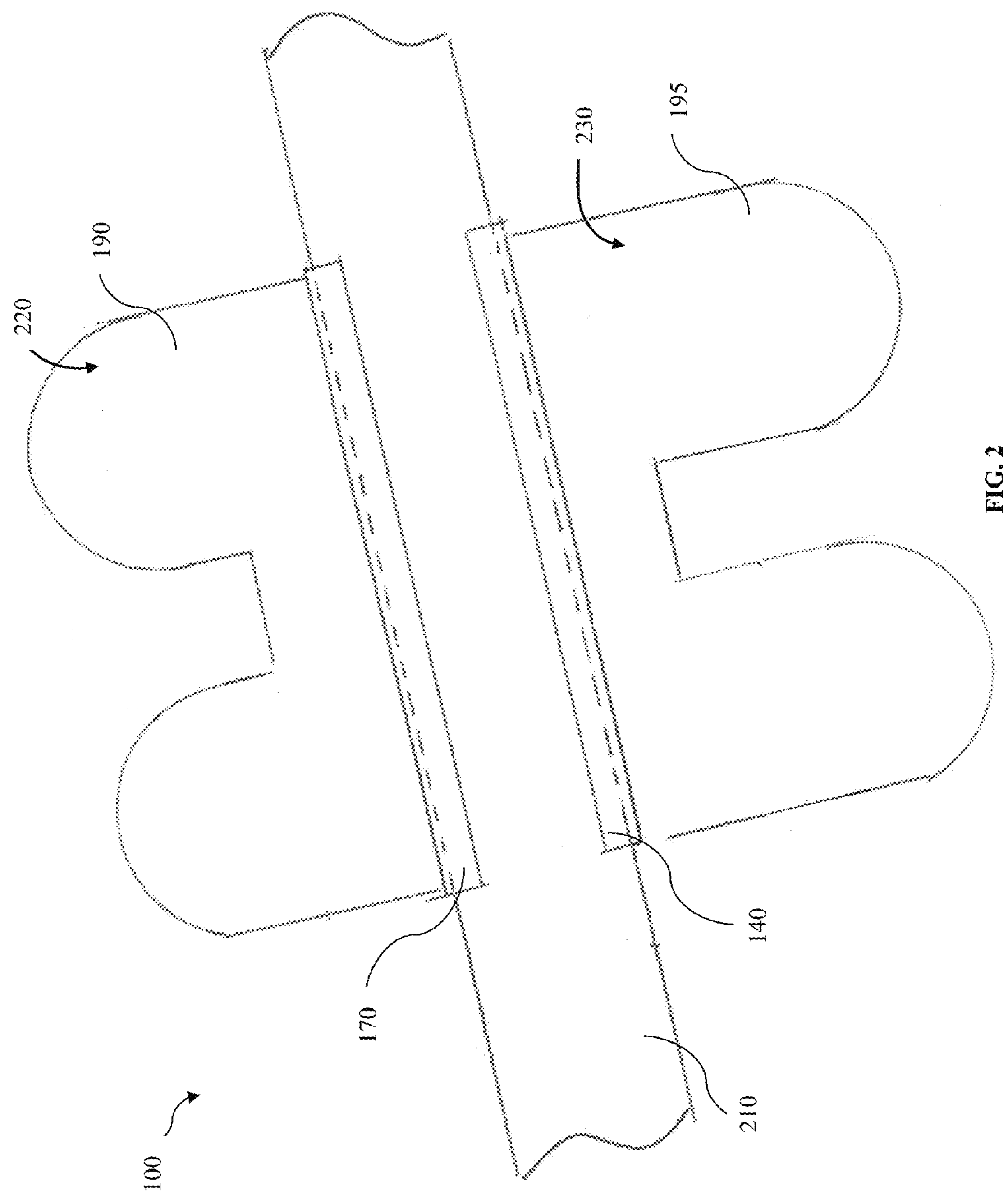
FIG. 2 representatively illustrates a top view of the tie-down strap retention device.
Figure 3:
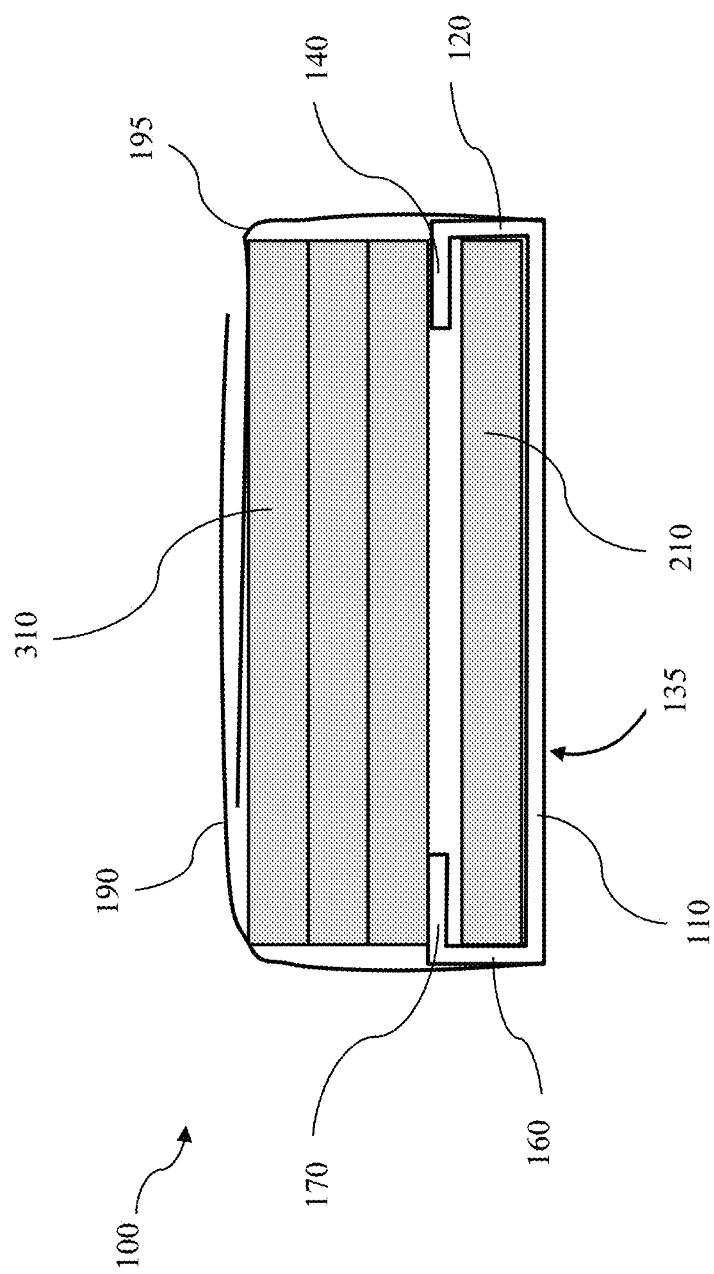
FIG. 3 representatively illustrates a view of the tie-down strap retention device secured around a tie-down.

Referring to FIGS. 1, 2, and 3, a tie-down strap retention device 100 may comprise a strap board 110, a first strap retention flap 190 may be coupled to the strap board 110, and a second strap retention flap 195 coupled to the strap board 105. The first strap retention flap 190 may be configured to be coupled to the second strap retention flap 195 such that a loop is formed between the first strap retention flap 190, the second strap retention flap 195, and covering a portion of the strap board 110 as shown in FIG. 3.

In one embodiment, the strap holder 105 may comprise a strap board 110. The strap board 110 may comprise an upper surface 130 and a lower surface 135. The upper surface 130 of the strap board 110 may be a substantially flat surface on which a tie-down strap 210 may be placed as shown in FIG. 2. The width and length of the strap board 110 may comprise any suitable dimensions that may be determined according to any suitable criteria such as depending on the type of tie-down 210 it is used for. For example, in one embodiment, the strap board 110 may comprise a length of between four and ten inches and have a width suitably configured to receive a tie-down 210 of about 2 inches in width while. In a second embodiment, the strap board 110 may comprise a length of between two and twelve inches and have a width suitably configured to receive a tie-down 210 of about 3 inches in width.

In one embodiment, the upper surface 130 and the lower surface 135 of the strap board 110 may comprise different materials and/or textures. For example, the upper surface 130 of the strap board 110 may be configured with various textures to aid in holding the tie-down 210 to the strap board 110 and/or preventing the tie-down 210 from moving around when placed on the strap board 110. For example, the upper surface 130 of the strap board 110 may be configured with tracks, grooves, ridges, and the like to provide the strap board 110 with additional textures to aid in keeping the tie-down 210 in place when placed on the strap board 110.

In one embodiment, the lower surface 135 of the strap board 110 may comprise the same material and/or texture as the upper surface 130. In other embodiments, the lower surface 135 of the strap board 110 may comprise a different material than the upper surface 130. For example, the lower surface 135 of the strap board may comprise an adhesive surface which may permit the tie-down strap retention device 100 to be adhered to a different surface. For example, the lower surface 135 may comprise a double-sided adhesive or a magnetic coating to allow the tie-down retention device 100 to adhere to the side of a package, transport device, and/or a vehicle.

In one embodiment, the strap board 110 may comprise any suitable material or a variety of materials including, but not limited to, wood, plastic, rubber, metal, or the like and any combination of the like. For example, the upper surface

130 of the strap board 110 may be manufactured using a material such as texturized rubber, which creates friction between the tie-down 210 and the upper surface 130 of the strap board 110 to prevent the tie-down strap retention device 100 from moving relative to the tie-down 210 once it is attached.

In one embodiment, the strap holder 105 may be configured to be rigid or flexible. For example, in one embodiment, when a loop is formed between the first strap retention flap 190 and the second strap retention flap 195, tension created between the two may cause the strap board 110 to at least partially bow and/or warp. Different materials may allow various degrees of bowing/warping (e.g., metals may provide for less bowing/warping compared to plastics or rubber).

Now referring to FIG. 1, in one embodiment, a first strap retention section 140 and a second strap retention section 170 may be coupled to the strap board 110. The first and second strap retention sections 140, 170 may be configured to keep the tie-down 210 in place once the tie-down 210 is placed on the strap board 110. A first edge portion 120 may be configured to project upwardly from the upper surface 130 of the strap board 110. The first edge portion 120 may be configured to extend between a first end and a second end of the strap board 110. A first strap retention section 140 may be configured to extend inwardly from the first edge portion 120 towards a center portion of the upper surface 130 to form a first space 150 between the upper surface 130 of the strap board and the first strap retention section 140. A second edge portion 160 may be configured to project upwardly from the upper surface 130 of the strap board 110. The second edge portion 160 may be configured to extend between a first end and a second end of the strap board 110. A second strap retention section 170 may be configured to extend inwardly from the second edge portion 160 towards a center portion of the upper surface 130 to form a second space 180 between the upper surface 130 of the strap board and the second strap retention section 170.

In one embodiment, when a tie-down 210 is placed on the strap board 110, the first 140 and second 170 strap retention sections may be configured to prevent the tied-down 210 from being separated from the strap holder 105. For example, the first and second strap retention sections 140, 170 may be configured to provide a downward force upon the tie-down 210 when placed within the tract 115. The downward force may act to prevent the tie-down 210 from slipping, moving, and/or otherwise detaching itself from the strap board 110 and/or the strap holder 105.

In one embodiment, the first and second strap retention sections 140, 170 may be configured to be flexible. For example, to insert a tie-down 210 into the strap holder 105, one may first lift one of either the first or second strap retention sections 140, 170 and insert a portion of the tie-down 210. The corresponding strap retention section may then be lifted such that the different portion of the tie-down 210 may be inserted. Once both portions of the tie-down 210 are inserted into the strap holder 105, the first and second strap retention sections 140, 170 may act to hold the tie-down 210 from detaching from the strap holder 105 and/or the strap board 110.

In one embodiment, the amount of space between the upper surface 130 and the first and second strap retention sections 140, 170 may be different. For example, one of either the first or the second retention sections 140, 170 may be placed at a lower/higher height compared to the other such that one can more easily insert a tie-down 210 into the strap holder 105 and/or create a more secure fit around the tie-down 210. For example, a first portion of the tie-down 210 may be inserted under the strap retention section 140, 170 with a higher clearance (i.e., larger space) relative to the strap board 110, and then a second portion of the tie-down 210 may be inserted into the space under the strap retention section 140, 170 with a lower clearance.

In one embodiment, the strap retention device 100 may be formed from a singular material. In that case, the first edge 120 may be folded to form a first strap retention section 140, and the first edge 120 may project upwardly from the upper surface 130 of the strap board 110 extending between the first end and the second end of the strap board 110. The second edge 160 may be folded to form a second strap retention section 170, and the second edge 160 may project upwardly from the upper surface 130 of the strap board 110 extending between the first end the second end of the strap board 110. The first and the second strap retention sections 140, 170 may extend outwardly from first and the second edge 120, 160 towards a center portion of the singular material. A first and a second space 150, 180 may be formed between the upper surface 130 of the strap board 110 and the first and the second strap retention sections 140, 170. A first and a second retention flap 190, 195 may be coupled to the lower surface 135 of the strap board 110. The first and the second retention flap 190, 195 may be configured to be detachably coupled to each other to form a self-locking structure to retain any extra portions of the tie-down 210 not able to fit within the first and the second spaces 150, 180.

In yet another embodiment, the strap retention device 100 may comprise a partially enclosed tract 115. The partially enclosed tract 115 may be formed from a first and a second folded edge 120, 160 of the strap board 110. The first and the second folded edge 120, 160 may be configured to project substantially vertically upward from a surface of the strap board 110. The first and the second folded edge 120, 160 may then be configured to extend substantially horizontally towards a center portion of the strap board 110. The vertical 120, 160 and horizontal 140, 170 projections may form a substantially ninety-degree angle. The partially enclosed tract 115 may be formed by the horizontal projections 140, 170 of the first and second folded edges 120, 160 as well as the spaces 150, 180 formed between the surface of the strap board 110 and the first and the second horizontal projections 140, 170 of the first and second folded edges 120, 160.

In one embodiment, the first and/or the second strap retention sections 140, 170 may be manufactured independently and attached to the strap board 110 separately. Strap retention sections of various sizes and materials may be used depending on the application in which the tie-down retention device 100 is utilized. The strap board 110 and the first and second strap retention sections 140, 170 may comprise complimentary attachment points such that various strap boards and strap retention sections may be coupled together. For example, the strap board 110 and the first and the second strap retention sections 140, 170 may comprise adhesives, magnets, interlocking connectors, and the like to facilitate the coupling of the strap board 110 to the first and the second strap retention sections 140, 170.

In one embodiment, the first and the second strap retention sections 140, 170 may comprise any suitable shape or size. For example, the first and the second strap retention sections 140, 170 may comprise a substantially rectangular receiving area forming a surface substantially parallel to and positioned above the upper surface 130 of the strap board 110. In another embodiment, the first and the second strap retention sections 140, 170 may comprise receiving areas that are round or of any other suitable different geometrical shapes.

Figure 4:
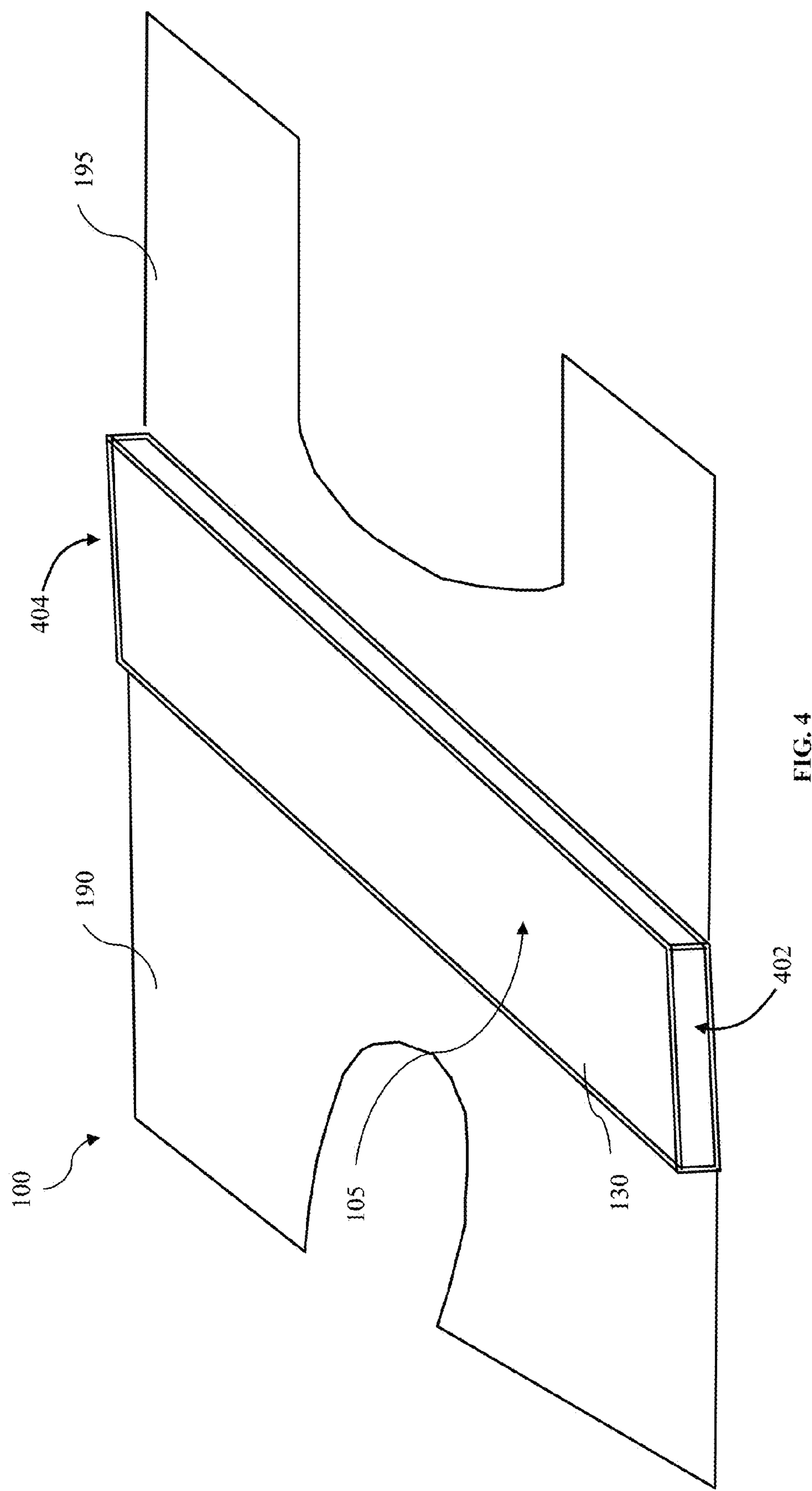
FIG. 4 representatively illustrates a tie-down strap retention device in accordance with an alternative embodiment of the present technology.

Now referring to FIG. 4, in an alternative embodiment, the strap holder 105 may comprise a substantially rectangular cuboid shape having a first open end 402 and a second open end 404, wherein each is suitably configured to receive the tie-down strap 210. In this embodiment, a first end of the tie-down strap 210 may be inserted into either of the first or second open ends 402, 404 and passed through to exit from the opposite end of the strap holder 105. An interior portion of the strap holder 105 may comprise any suitable size or shape. For example, in one embodiment, the interior portion of the strap holder 105 may be sized such that only a single length of tie-down strap 210 may be passed through the interior. In an alternative embodiment, the interior portion of the strap holder 105 may be sized such that multiple lengths of tie-down strap 210 may be passed through the interior.

Referring back now to FIG. 3, in one embodiment, the first and the second strap retention flaps 190, 195 may be configured to selectively cover any extra tie-down material 310 not able to fit within the first and second ends of the strap board 110. For example, the tie-down strap 210 may comprise an excess length of material 310 that may be folded, rolled, or otherwise collected over the strap board 110. The first and the second strap retention flaps 190, 195 may be suitably configured to be positioned over the collected excess material 310 to secure the excess material 310 in place so that it does not hang free such that it may cause an unsafe condition.

In one embodiment, the first 190 and second 195 strap retention flaps may permanently attached or non-permanently coupled to the strap board 110 and/or strap holder 105. The first and the second strap retention flaps 190, 195 may be permanently attached to the strap board 110 using a variety of methods such as adhesives, stitching, clips, fasteners, and the like. Alternatively, the first and the second strap retention flaps 190, 195 may be non-permanently (i.e., detachably) coupled to the strap board 110. For example, the lower surface 135 of the strap board 110 may comprise a material that is configured to attach to, and detach from, the first and the second strap retention flaps 190, 195. Once detached from the lower surface 135 of the strap board 110, the first and the second strap retention flaps 190, 195 may be moved to a different position along the strap board 110 between the first end and the second end.

In one embodiment, the first 190 and second 195 strap retention flaps may be manufactured using a variety of materials such as plastics, fabric, metals, and the like. The first 190 and second 195 strap retention flaps may be manufactured using a singular piece or may be manufactured using multiple pieces of material. For example, the first strap retention flap 190 may be manufactured independently of the second strap retention flap 195 and coupled to the strap board 110. The first 190 and second 195 strap retention flaps may protrude outwardly from the strap board 110 by any suitable length or distance.

In one embodiment, the first 190 and second 195 strap retention flaps may be the same size or the first 190 and second 195 strap retention flaps may comprise different sizes relative to each other. For example, the first strap retention flap 190 may protrude further away from the strap holder 105 than the second strap retention flap 195. In this configuration, when a loop is formed between the first 190 and the second 195 strap retention flap, the extra length of the first strap retention flap 190 may allow the tie-down strap retention device 100 to be used for various lengths of remaining tie-down material 310. For example, to retain a lot of extra tie-down material 310 would require the loop to have a larger diameter to account for the extra material 310. By having the first strap retention flap 190 protrude further away from the strap holder 105, the extra tie-down material 195 can be retained under the loop as shown in FIG. 3.

In another embodiment, the first strap retention flap 190 may be manufactured together with the second strap retention flap 195. Once manufactured together, the first 190 and second 195 strap retention flaps may be coupled to the strap holder 105 as a singular piece. The first and second strap retention flaps 190, 195 may be coupled to the strap holder 105 by any suitable method or device such as adhesively and/or mechanically. For example, after the first and second strap retention flaps 190, 195 are manufactured, they may be attached to the lower surface 135 of the strap board 110 using a double sided adhesive. The first and second strap retention flaps 190, 195 may also be attached to the strap board using other methods such as fasteners, clips, magnets, stiches, and the like.

Figure 5:
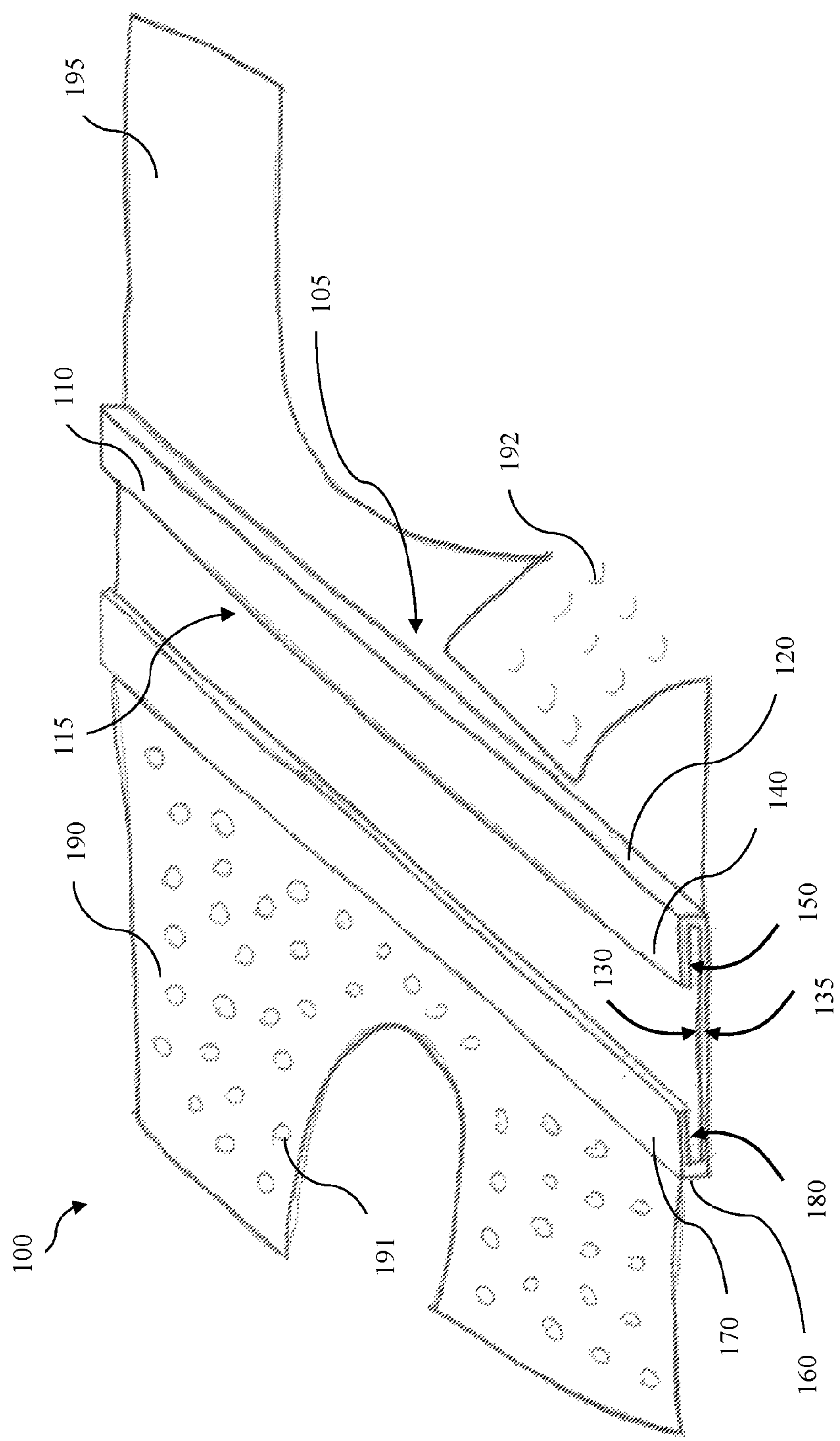
FIG. 5 representatively illustrates a view of the connecting material utilized on corresponding surfaces of the first and second retention flaps.

In one embodiment, the first 190 and second 195 strap retention flaps may be configured to be selectively coupled together by any suitable method or material, such as by a hook-and-loop fastener, a snapping mechanism, magnetically, a buckle, a hook/ring connector, an adhesive, and the like. It is understood by those in the art that the first and second retention flaps 190, 195 may comprise connecting material 191, 192 on opposite sides of the flaps 190, 195, such that when one of either the first or the second retention flap 190, 195 is placed other the other, the connecting material 191, 192 comes into contact with each other. In one embodiment, a loop between the first 190 and second 195 strap retention flaps may be formed when the connecting material 191, 192, such as a ring side of a hook-and-loop fastener disposed on the first strap retention flap 190 is placed over a hook side of the hook-and-loop fastener disposed on the second strap retention flap 195. The first 190 and second 195 strap retention flap may form the loop over the upper surface 130 of the strap board 110 as shown in FIGS. 1, 3, and 5.

In one embodiment, the first and the second strap retention flaps 190, 195 may be manufactured according to the layout shown in FIGS. 1 and 2. In other embodiments, the first and the second strap retention flaps 190, 195 may be manufactured using various other layouts. For example, the first and the second strap retention flaps 190, 195 may be manufactured without a depression in the middle (i.e., a single rectangular shape). The first and the second strap retention flaps 190, 195 may comprise a plurality of corresponding strips of material extending outwardly from the strap board 110 (not pictured). In this layout, the plurality of strips may provide the tie-down retention device 100 with improved tie-down 210 holding ability. For example, it may be the case that extra tie-down material may be thicker/thinner in certain positions along the strap board 110 between the first end and the second end, and the various strips can be applied to the various thicknesses to provide improved holding capabilities. In other embodiments, the first and the second strap retention flaps 190, 195 may form a loop beneath the strap board 110, or in a manner in which the entirety of the strap board 110 is enclosed within the loop formed by the first and the second strap retention flaps 190, 195.

In one embodiment, the position of the first and the second strap retention flaps 190, 195 on the strap board 110 may be fixed. In other embodiments, the position of the first and the second strap retention flaps 190, 195 may be adjustable along the strap board 110. For example, the first and the second strap retention flaps 190, 195 may be detachably coupled to the strap board 110 such that the first and the second strap retention flaps 190, 195 may be detached and placed along various positions of the strap board 110 between the first end and the second end. The first and the second strap retention flaps 190, 195 may be placed at positions such that the first and the second retention flaps 190, 195 are not directly facing each other. For example, the first strap retention flap 190 may be placed at a first position along the strap board 110 and the second strap retention flap 195 may be placed at a second position along the strap board 110.

In other embodiments, the first and the second retention flaps 190, 195 may be manufactured using various materials that may provide for a closed loop between the first and the second strap retention flap 190, 195s. For example, the first retention flap 190 may be manufactured using one side (e.g., ring side) of a hook-and-loop fastener type adhesive and the second retention flap 195 may be manufactured using the other side (e.g., hook side) of the hook-and-loop fastener type adhesive.

The loop formed between the first and the second retention flaps 190, 195 may be formed using a method other than stacking one flap over the other. For example, an envelope technique may be used in which one of either the first or the second retention flaps 190, 195 slides into the other. Other techniques for forming the loop may comprise intertwining the first and the second retention flaps 190, 195. Other materials may also be used to manufacture the first and the second retention flaps 190, 195. The first and the second retention flaps 190, 195 may be manufactured using the same material as each other, or they can be manufactured using different materials.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A retention device for use with a tie-down strap, comprising:

a strap board comprising:

a first edge portion projecting upwardly from an upper surface of the strap board and extending between a first end and a second end of the strap board;

a first strap retention section extending inwardly from the first edge portion towards a center portion of the upper surface to form a first space above the upper surface for receiving the tie-down strap;

a second edge portion projecting upwardly from the upper surface of the strap board and extending between the first end and the second end of the strap board substantially parallel to the first edge portion; and a second strap retention section extending inwardly from the second edge portion towards the center portion of the upper surface to form a second space above the upper surface for receiving the tie-down strap; and a first retention flap coupled to a bottom surface of the strap board adjacent the first edge portion; and a second retention flap coupled to the bottom surface of the strap board adjacent the second edge portion, wherein the first retention flap and the second retention flap comprise a connecting material configured to come into contact with each other when a self-locking structure is formed to retain an extra portion of the tie-down strap not able to fit within the first and second spaces.

2. The tie-down strap retention device of claim 1, wherein the strap board, the first and second edge portions, and the first and second retention sections are formed from a single material.

3. The tie-down strap retention device of claim 1, wherein the plurality of retention flaps cover substantially entirety of the upper surface of the strap board when coupled together.

4. The tie-down strap retention device of claim 1, wherein the strap board, the first and second edge portions, and the first and second retention sections are formed from a flexible material.

5. The tie-down strap retention device of claim 1, wherein the first retention flap runs along substantially all of the first edge of the strap board and the second retention flap runs along substantially all of the second edge of the strap board.

6. A retention device for use with a tie-down strap, comprising:

a tie-down strap board formed from a singular material, comprising:

a first edge portion of the tie-down strap board folded to form a first strap retention section, and the first edge portion projects upwardly from an upper surface of the tie-down strap board and extends between a first end and a second end of the tie-down strap board;

a second edge portion of the tie-down strap board folded to form a second strap retention section, and the second edge portion projects upwardly from an upper surface of the tie-down strap board and extends between the first end and the second end of the tie-down strap board; and a first retention flap coupled to a bottom surface of the tie-down strap board adjacent the first edge portion; and a second retention flap coupled to the bottom surface of the tie-down strap board adjacent the second edge portion, wherein the first retention flap and the second retention flap comprise a connecting material configured to come into contact with each other when a self-locking structure is formed to retain an extra portion of the tie-down strap not able to fit within a first space and a second space; and wherein:

the first and the second strap retention sections extend inwardly from the first and second edges towards a center portion of the singular material; and the first and second spaces is formed between the upper surface of the singular material and the first and the second strap retention sections.

7. The tie-down strap retention device of claim 6, wherein the first and second retention flaps cover substantially entirety of the upper surface of the tie-down strap board when coupled together.

8. The tie-down strap retention device of claim 6, wherein the tie-down strap board, the first and second edge portions, and the first and second strap retention sections are formed from a flexible material.

9. The tie-down strap retention device of claim 6, wherein the first retention flap runs substantially along all of the first edge portion of the tie-down strap board and the second retention flap runs substantially along all of the second edge portion of the tie-down strap board.

10. A retention device for use with a tie-down strap, comprising:

a material with a first and a second folded edges, wherein the first and the second folded edges is configured to project substantially vertically upward from a surface of the material and substantially horizontally towards a center portion of the material, wherein the vertical and horizontal projections form a substantially ninety-degree angle;

a partially enclosed tract formed by the first and second folded edges, wherein the partially enclosed tract is formed by the horizontal projections of the first and second folded edges;

a first retention flap coupled to a bottom surface of the material adjacent the first folded edge; and a second retention flap coupled to the bottom surface of the material adjacent the second folded edge, wherein the first retention flap and the second retention flap comprise a connecting material configured to come into contact with each other when a self-locking structure is formed to retain an extra portion of the tie-down strap not able to fit within a first space and a second space;

wherein:

the tract further comprises the first space and the second space configured to receive a tie-down strap between the surface of the material and the horizontal projections of the first and second folded edges.

11. The tie-down strap retention device of claim 10, wherein the plurality of retention flaps cover substantially entirety of the surface of the material when coupled together.

12. The tie-down strap retention device of claim 10, wherein the material, the first and second folded edges, and the partially enclosed tract are formed from a flexible material.

13. The tie-down strap retention device of claim 10, wherein the first retention flap runs along substantially all of the first folded edge of the material and the second retention flap runs along substantially all of the second folded edge of the material.

* * * * *